Figure 1:
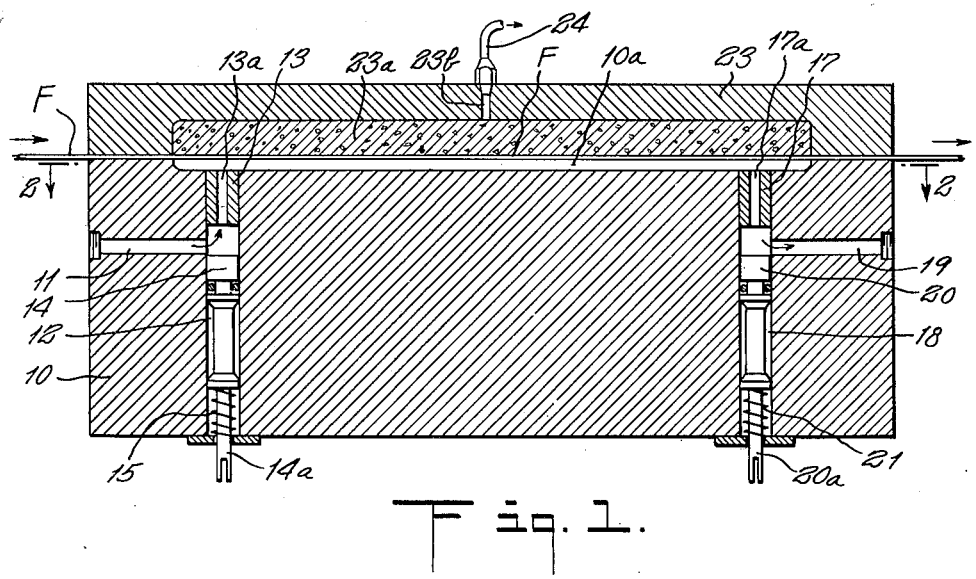

Feb. 26, 1952     E. J. MAIWALD, JR     2,587,350
RAPID PROCESSING APPARATUS FOR PHOTOGRAPHIC FILM
Filed July 25, 1950     2 SHEETS—SHEET 1

INVENTOR.
ERNEST J. MAIWALD, JR
BY
HIS ATTORNEYS

Patented Feb. 26, 1952

2,587,350

UNITED STATES PATENT OFFICE 2,587,350

RAPID PROCESSING APPARATUS FOR PHOTOGRAPHIC FILM

Ernest J. Maiwald, Jr., Oyster Bay, N. Y., assignor to Kenyon Instrument Company, Inc., Huntington, N. Y.

Application July 25, 1950, Serial No. 175,715

7 Claims. (Cl. 95—94)

This invention relates to the rapid processing of photographic film. It has particular reference to an improved apparatus for this purpose.

In the rapid processing of photographic film, it has been proposed heretofore to feed a strip of exposed film to a processing head having a recess or shallow cup to which the processing fluids are delivered in sequence. The film is fed over the mouth of the shallow cup so that the processing fluids contact the emulsion side of the film. The shallow cup may be made in various geometrical forms, depending upon the type of film to be processed, but in any case it has an inlet port for the processing fluids and also an outlet port through which the spent fluids are discharged by suction. An apparatus of this type is disclosed in Tuttle application Serial No. 114,701, filed September 9, 1949.

The fluid flow into the cup of such an apparatus is due to a pressure differential between the inlet and outlet ports of the processing head and is made possible because the processing cup is sealed by the photographic film itself against any appreciable leakage. That is, the suction in the fluid discharge line from the cup acts to draw the film against the edge or rim of the cup and form a seal. However, this method of sealing the film side of the cup by the film itself leads to an operating difficulty in that the film is drawn into the cup due to the lower pressure at the cup side of the film than at the opposite or base side of the film, and in some cases the film is drawn into the cup sufficiently to interfere with the flow of processing fluids through the cup.

The present invention has for its principal object the provision of a rapid film processing apparatus of the type described, which overcomes the above-mentioned difficulty.

According to the invention, I provide a processing head forming a path for movement of the film strip along the head, the head having a recess opening into the film path and forming a processing station. A duct communicates with the recess for delivering a processing fluid to the overlying film, and a suction pipe communicates with the recess to draw the emulsion face of the film against the edges of the recess, in order to seal the latter and also to draw the processing fluid through the recess. At the base side of the film is a plain, flat member opposite the recess or processing station in the head. This member is capable of operating as a suction device on the base side of the film. It may take the form of a perforated plate or it may be a block of porous, sponge-like material, such as sintered metal or ceramic. A suction pipe communicates with this block to create a partial vacuum therein. Pressure within this block is maintained lower than the pressure in the processing recess. Thus, the base side of the film is drawn against the block and the tendency of the suction on the emulsion side of the film to draw the film into the processing recess is counteracted.

With the new apparatus, the processing fluids may be delivered to the processing recess through a port extending along one edge of the recess, and the spent fluids may be discharged through a similar port extending along the opposite edge of the recess. The fluids will then flow at a uniform rate in a uniformly thin layer along the film from one edge of the processing recess to the opposed edge, thereby insuring rapid and uniform developing, fixing, etc. of the image.

In one form of the apparatus, the member opposite the processing recess in the head is movable in the direction of the film path to feed the film along the path. Thus, by maintaining the partial vacuum in this movable member after completion of the processing, the movable member also serves as a means for feeding the successive frames of the film to and from the processing station.

Figure 2:
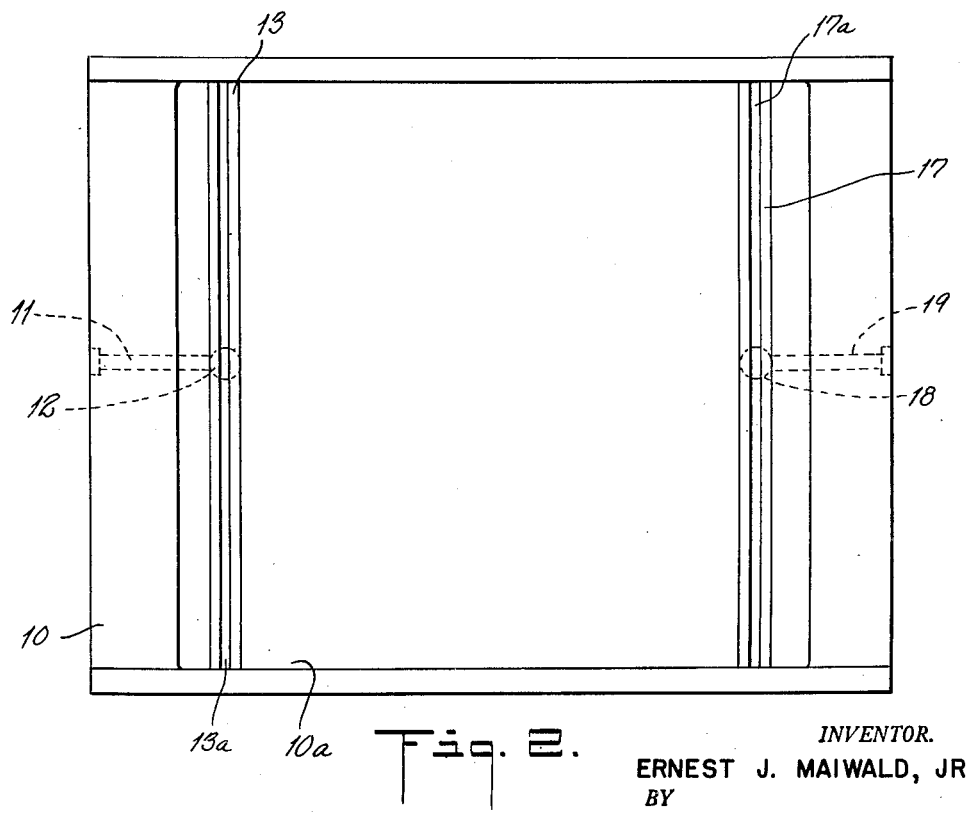
Figure 3:
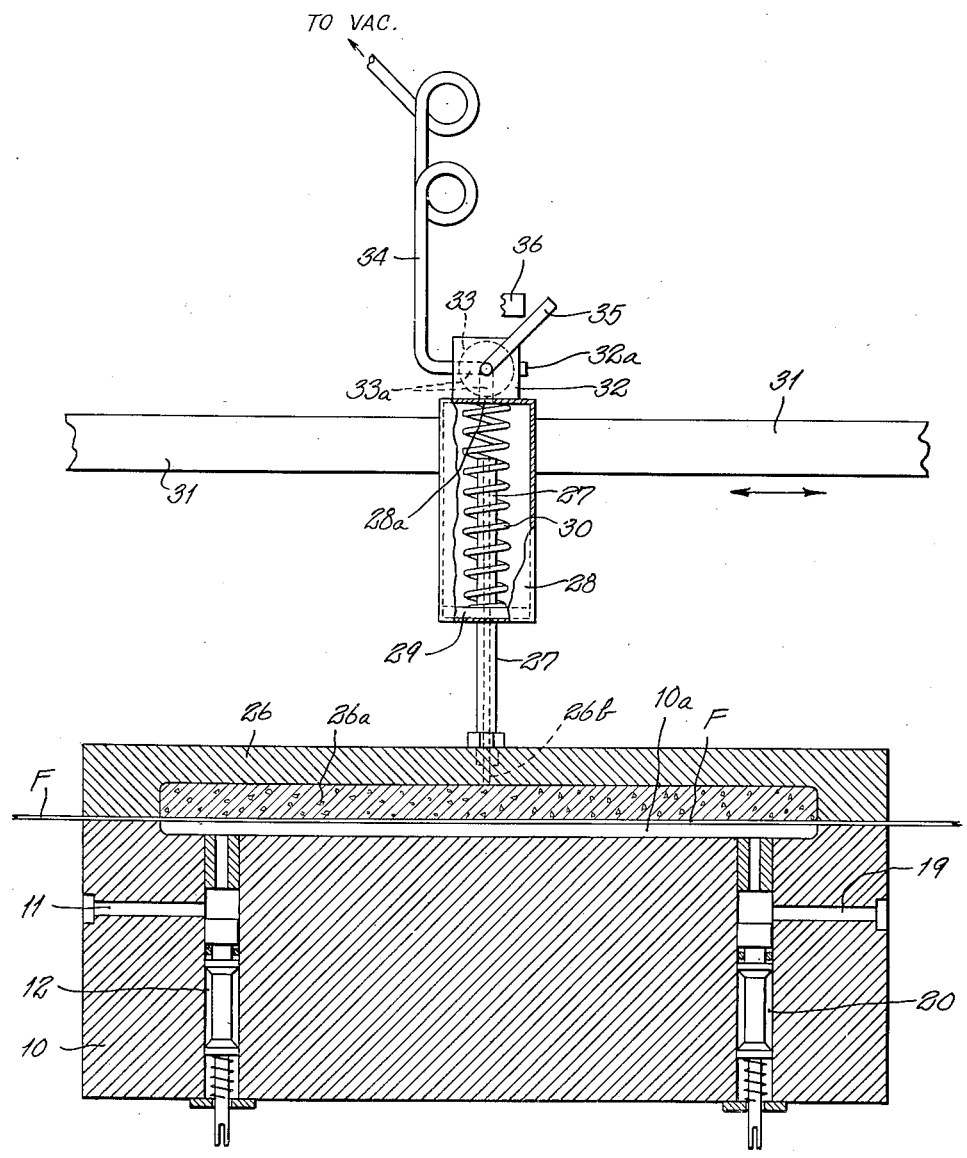

For a better understanding of the invention, reference may be had to the accompanying drawings, in which Fig. 1 is a longitudinal sectional view of a preferred form of the new apparatus;

Fig. 2 is a front view of the main body of the processing head as illustrated in Fig. 1, and Fig. 3 is a longitudinal sectional view, partly in plan, of a modified form of the new apparatus, in which the member for counteracting displacement of the film into the processing recess is also used for transporting the film to and from the processing station.

Referring to Figs. 1 and 2, the apparatus there shown comprises a metal block 10 forming the main body of a film processing head. In its front face, the body 10 is formed with a shallow recess 10a which receives the fluids for processing a photographic film F. The film F is in strip form and is fed intermittently in any suitable manner to bring previously exposed portions of the film into registry with the processing recess 10a. The latter, as shown, is substantially square.

When an exposed portion of the film arrives at the recess 10a, the developer fluid is first delivered to the recess through a supply passage 11 leading to a bore 12 in the block 10. At the front end of the bore 12 is a hollow elongated insert 13 extending along one end of the recess 10a from side to side of the latter. The insert 13 has a passage 13a communicating with the bore 12 and extending crosswise of the block, between the sides of recess 10a. Thus, the passage 13a forms an inlet port extending along one edge of the processing recess. The bore 12 opens into the elongated space receiving the insert 13. Flow of the developer fluid is controlled by a valve 14 slidable in the bore 12 and having a stem 14a projecting from the rear face of the block 10. The valve is urged by a spring 15 toward the insert 13, so that the valve in its normal position closes the inner end of passage 11 and thereby prevents flow of developer fluid to the distributor passage 13a. Supply of developer fluid to the distributor passage 13a is initiated by drawing the valve rearwardly to the position illustrated in Fig. 1, against the action of spring 15, which may be effected by any suitable actuator (not shown) connected to the stem 14a, such as a solenoid.

An insert 17 similar to the insert 13 extends along the opposite edge of the processing recess 10a and has an elongated passage 17a forming a discharge port. A bore 18 extends from the rear face of the block 10 towards the recess 10a and opens into the elongated space which receives the insert 17. A vacuum passage 19 also opens into this space and is connected to a source of vacuum (not shown). The passage 17a and the recess 10a may be connected to or disconnected from the vacuum passage 19 by a valve 20 slidable in the bore 18 and having a stem 20a projecting from the rear face of the block 10. The valve 20 is urged forwardly by a spring 21 so that the valve in its normal position closes the inner end of vacuum passage 19 and thereby breaks the connection between the recess 10a and the vacuum source. When the valve 20 is drawn against the spring 21, as by means of a solenoid (not shown) connected to the stem 20a, the processing recess is connected to the vacuum source through the elongated insert 17 and passage 19.

It will be understood that with the valves 14 and 20 in their open positions, as illustrated in Fig. 1, the developer fluid will be drawn by suction from a suitable supply pipe (not shown) connected to passage 11 into one end of the recess 10a by way of the elongated distributing passage 13a. It will then be drawn in a thin layer along the emulsion side of film F to the discharge port 17a and thence through passage 19 to a suitable waste receptacle (not shown) in which the vacuum is maintained. By reason of the partial vacuum maintained in the recess 10a, the film F tends to be drawn against the edges of this recess and thereby prevent any appreciable leakage between the film and the block 10.

Since the recess 10a is quite shallow, the developer fluid will flow rapidly along the emulsion side of the film from the inlet port 13a to the outlet port 17a; and because of the arrangement of these ports along the opposing edges of the recess, from side to side of the latter, the fluid will flow at a uniform rate throughout the exposed surface of the film. Consequently, the processing is effected rapidly and with uniformity.

Upon completion of the developing operation the valve 14 is closed to cut off the supply of developer fluid. Thereupon, the fixer solution is admitted to the elongated space containing the insert 13, by a passage and valve similar to the passage 11 and valve 14, respectively, the fixer solution being drawn along the emulsion side of the film and discharged through ports 17a and vacuum passage 19. Washing and drying fluids may then be admitted in sequence to the distributor insert 13 by similar passages and valves, it being understood that for each processing fluid to be applied to the film F the head 10 is provided with an arrangement such as that illustrated in Fig. 1 for delivering the fluid to the distributor insert 13.

During the operation of the processing unit, the suction in the fluid discharge line 19 creates a sub-atmospheric pressure in the recess or shallow cup 10a. Accordingly, there is a tendency for the emulsion side of the film F to be drawn against the head 10 over its recess 10a, so as to seal the edges of the recess. In this way, the film acts to prevent leakage of air into the recess 10a, which would interfere with the feeding of the processing fluids and impair the processing operations. The sub-atmospheric pressure in the recess 10a also tends to draw the overlying film into the recess toward the bottom thereof, thereby distorting the film and impeding the rapid and even flow of the fluid along the emulsion side of the film. To counteract this tendency, I provide a device which will now be described.

A member 23 is disposed on the base side of the film F adjacent the head 10. The member 23 contains a section or block 23a of porous material opposite the processing recess 10a in the head. The path of the film F extends between the member 23 and the head 10 and between the porous block 23a and recess 10a. A suction pipe 24 is connected to the member 23 and communicates with its porous block 23a, the pipe 24 being connected to any suitable vacuum source (not shown).

The suction pipe 23 creates and maintains in the spaces of the porous block 23a a partial vacuum greater than that in recess 10a, thereby counteracting the tendency for the film F to be drawn into the recess 10a by the partial vacuum in the latter recess. Consequently, during the operation of the processing unit, the film F is held in a substantially flat position over the processing recess 10a, as shown in Fig. 1, whereby the processing fluids may flow freely along the emulsion side of the film without interference due to bulging of the film into the recess 10a. By maintaining a somewhat higher vacuum in the porous block 23a than in the opposing recess 10a, the film F will be held flat against the adjacent face of the block 23a; but at the same time the suction in processing recess 10a will draw both the film F and the member 23 against the edges of recess 10a and thereby seal the latter.

When the processing of the film frame overlying the recess 10a is completed, the film is advanced to bring the next frame into registry with the recess 10a, and the processing operation is repeated. Before each advance movement of the film F, the valve 20 may be moved inward against spring 21 to break the connection between recess 10a and the suction line 19, whereby the pressure in recess 10a returns to atmospheric pressure, and at the same time the partial vacuum in the block 23a may be broken, as by means of a suitable valve (not shown) in the suction line 24. Thus, the film may be advanced between the members 10 and 23 without the resistance which would otherwise be imposed due to the suction in the recess 10a and block 23a. It will be understood that the fluid supply valve 14 (and the similar valve for each additional processing fluid) is closed when the film is advanced to bring the next frame into position over the recess 10a.

Referring now to Fig. 3, the apparatus as there shown comprises a processing head 10 similar to that illustrated in Figs. 1 and 2. The path of the film F extends between the recess 10a and a porous block 26a secured in a member 26 adjacent the head. Suction pipe 27 is connected to the member 26 and the communicates with the block 26a through a passage 26b. The member 26 and the suction pipe 27 are supported by a carrier 28 in the form of a cylinder. As shown, the pipe 27 extends through the lower end of the carrier cylinder 28 and is provided in the cylinder with a collar 29. A spring 30 in the cylinder is coiled around the upper end portion of pipe 27 and urges the collar 29 against the lower end of cylinder 28. The cylinder is mounted on a rod 31 which constiutes a means for reciprocating the parts 26, 27 and 28 in a path parallel to the path of the film F, the rod 31 being slidably mounted in suitable bearings (not shown).

A valve stator 32 is mounted on top of the carrier cylinder 28 and communicates with the interior of the cylinder through a port 28a. The stator also has a duct 32a communicating with atmosphere. Within the stator 32 is a rotor 33 having interconnecting passages 33a. With the rotor in the position illustrated in Fig. 3, the cylinder 28 is connected through passages 33a with a suction hose 34, whereby air is exhausted from recess 26a by way of pipe 27 and cylinder 28 so as to maintain partial vacuum in the spaces of block 26a.

In the apparatus illustrated in Fig. 3 the film processing operations are similar to those described in connection with the apparatus illustrated in Figs. 1 and 2. However, when the processing is completed and the recess 10a is disconnected from its suction line 19, the actuator rod 31 is moved in the direction in which the film is to be advanced to bring the next frame into registry with the processing recess 10a. During this movement of the rod 31, the film F adheres to the member 26 due to the suction maintained in block 26a by the connection through pipe 27, cylinder 28, and rotor passages 33a to the vacuum hose 34. Therefore, the film will be advanced with the member 26, the cylinder 28 and the rod 31, so as to deliver the next film frame to the processing station and move the previously processed frame to a subsequent station, where it may be further processed or where the image may be projected upon a screen. Near the end of the advance movement of rod 31, a stationary stop (not shown) engages a lever 35 on the rotor 33 and causes the rotor to be turned counterclockwise through approximately 90°, whereupon the port 28a is disconnected from the suction hose 34 and connected to the atmosphere duct 32a. As a result, the suction in block 26 is broken and the film is released from the member 26. Then, the rod 31 is retracted and moves back over the stationary film to the initial position illustrated in Fig. 3. Near the end of this return movement, the lever 35 engages a second stop 36, which causes the rotor 33 to rotate clockwise to its initial position, thereby disconnecting port 28a from atmosphere and connecting it to the suction hose 34. The partial vacuum will then be restored in block 26a so as to counteract the tendency for the film F to be drawn into the recess 10a during the subsequent processing operations on the film frame lying between the parts 10 and 26.

It will be understood that in the apparatus illustrated in Fig. 3 the member 26 and its associated suction line serve not only to maintain the film F in a substantially flat position during the processing operations but also to advance the film intermittently relative to the processing head 10. The spring 30 imposes a pressure on the member 26 to urge this member against the film F and the processing head 10, and the spring allows the member 26 to yield during the reciprocating movements of the rod 31 incident to advancing of the film.

While I have shown each of the members 23 and 26 with a porous block of approximately the same area and configuration as the opposing recess 10a, each of these members may be provided instead with a series of holes or channels forming a porous section connected to the suction tube 24 or 34. In either case, the porous section forms in the plane of the film base a surface against which the film is held by the suction in the tube 24 or 34.

I claim:

1. Apparatus for rapid processing of photographic film, which comprises a processing head forming a path for movement of the film along the head, the head having a recess forming a processing station adjacent said path, a duct communicating with the recess for delivering a processing fluid thereto, a suction pipe communicating with the recess for drawing the emulsion face of the film against the edges of the recess and drawing the fluid through the recess, a member having a porous section opposite said recess, the film path extending between said section and recess, and a suction pipe communicating with said porous section for creating a partial vacuum therein to counteract displacement of the film into said recess.

2. Apparatus according to claim 1, in which said recess has ports extending along opposite edges thereof and communicating, respectively, with the first suction pipe and said duct.

3. Apparatus according to claim 1, comprising also means for moving said member in the direction of the film path to feed the film along said path.

4. Apparatus according to claim 1, comprising also a carrier for said member and said last pipe, means for reciprocating the carrier parallel to the film path, and a valve for interrupting the suction in said last pipe.

5. Apparatus according to claim 1, comprising also a carrier for said member and said last pipe, means for reciprocating the carrier parallel to the film path, a valve for interrupting the suction in said last pipe, and means for operating the valve in timed relation with the reciprocation of the carrier.

6. Apparatus according to claim 1, in which said porous section has a surface in the plane of the film base.

7. Apparatus according to claim 1, in which said section comprises a porous block.

ERNEST J. MAIWALD, Jr.

REFERENCES CITED

The following references are of record in the file of this patent:

UNITED STATES PATENTS

| Number | Name | Date |
| --- | --- | --- |
| 2,419,853 | Pask | Apr. 29, 1947 |
| 2,492,133 | Cobb | Dec. 27, 1949 |